United States Patent
Moning et al.

(10) Patent No.: US 7,390,374 B2
(45) Date of Patent: Jun. 24, 2008

(54) LEATHER OR LEATHER-LIKE COMPOSITE MATERIAL

(75) Inventors: Ernst-Wolfgang Moning, Langenau (DE); Ulrich Zwissler, Gerstetten (DE)

(73) Assignee: Zoeppritex-Verbundstoffe GmbH & Co., KG, Gerstetten-Heldenfingen (DE)

( * ) Notice: Subject to any disclaimer, the term of this patent is extended or adjusted under 35 U.S.C. 154(b) by 274 days.

(21) Appl. No.: 11/038,758

(22) Filed: Jan. 18, 2005

(65) Prior Publication Data

US 2006/0159884 A1 Jul. 20, 2006

(30) Foreign Application Priority Data

Jan. 15, 2004 (DE) .................. 10 2004 002 381

(51) Int. Cl.
B29C 65/48 (2006.01)
B32B 37/00 (2006.01)

(52) U.S. Cl. .................. 156/279; 156/280; 156/298; 156/300

(58) Field of Classification Search ............. 156/279, 156/280, 297–300
See application file for complete search history.

(56) References Cited

U.S. PATENT DOCUMENTS

| | | | | |
|---|---|---|---|---|
| 3,775,205 A | * | 11/1973 | Hermann et al. | 156/72 |
| 4,139,613 A | * | 2/1979 | Hefele | 427/197 |
| 4,224,376 A | * | 9/1980 | Ishige et al. | 428/317.7 |
| 4,445,954 A | | 5/1984 | Adams et al. | |
| 4,899,411 A | * | 2/1990 | Johnson et al. | 12/142 R |
| 5,403,884 A | | 4/1995 | Perlinski | |
| 5,478,134 A | * | 12/1995 | Bernard et al. | 297/218.1 |
| 6,028,017 A | * | 2/2000 | Curtin et al. | 442/370 |
| 6,746,774 B1 | * | 6/2004 | Schaefer | 428/423.4 |

FOREIGN PATENT DOCUMENTS

| | | |
|---|---|---|
| DE | 3133690 A1 * | 3/1983 |
| DE | 38 32 822 A1 | 3/1990 |
| DE | 90 17 007.5 | 4/1991 |
| DE | 198 45 735 | 4/2000 |
| DE | 198 45 735 A1 | 4/2000 |
| DE | 298 19 703 U1 | 4/2000 |
| FR | 2 814 093 | 3/2002 |
| GB | 2 152 842 A | 8/1985 |

OTHER PUBLICATIONS

English Abstract of DE 3,133,690 A1.*
European Search Report dated Mar. 26, 2008 for the corresponding European Application No. EP 04 02 9626.

* cited by examiner

*Primary Examiner*—Philip C Tucker
*Assistant Examiner*—Sing P Chan
(74) *Attorney, Agent, or Firm*—Cohen Pontani Lieberman & Pavane LLP

(57) ABSTRACT

A leather or leather-like composite material that supports a layer of soft foam laminated to its back side, the outside of which foam is flocked with textile staple fibers. When this material is manufactured, the back side of a leather or a leather-like material is laminated to a layer comprised of a soft foam, whose outside oriented away from the leather or leather-like material is flocked with staple fibers.

6 Claims, 1 Drawing Sheet

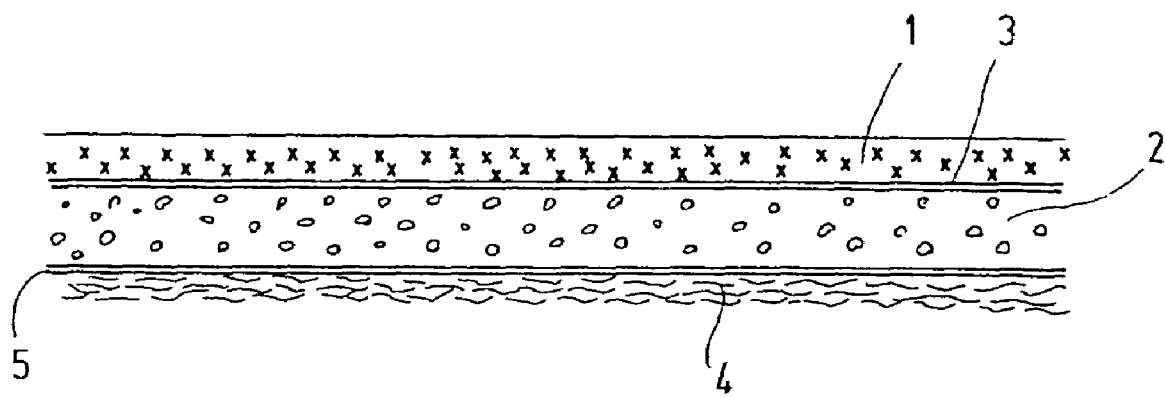

LEATHER OR LEATHER-LIKE COMPOSITE MATERIAL

FIELD OF THE INVENTION

The invention relates to a leather or leather-like composite material that is particularly suited for use in the automotive field, in particular as an upholstery material for vehicle seats. The invention also relates to a method for manufacturing this material.

BACKGROUND OF THE INVENTION

Particularly in high-end passenger vehicles, it is increasingly customary in the automotive industry to offer vehicle seats that are covered with genuine leather. To that end, it is known to use leather that supports a layer of soft foam laminated to its inside or back side, which foam improves its cushioning properties and increases seat comfort. As a rule, the foam is a soft polyurethane (PUR) foam, which is ether-based as well as ester-based. Because of the sticky or clinging properties of the soft foam surface, leather having its back side laminated solely with soft foam cannot easily be handled by conventional sewing machines. For this reason, the outside of the soft foam layer is provided with a laminated textile fabric that increases the slipperiness properties of the back side of the leather composite material thus produced so that it can be handled more easily. At the same time, this slipperiness is also important for a seat covering because it allows the seat covering to slide to the required extent in relation to the padding when an elastic deformation occurs during use.

In practice, the above-described leather composite material for seat covers is frequently manufactured by flame-treating one side of a PUR soft foam layer in order to melt the foam and then embedding a textile cloth in the heat-liquefied foam. The disadvantage to this process is that it involves the burning of PUR foam, which gives off noxious emissions. In addition, foam that has been treated with a so-called flame coating of this kind has a tendency to give off pollutants, also referred to as "fogging," which means that it gives off a certain annoying odor.

Aside from this, using the known leather composite material with a textile backing on the outside of the soft foam layer has a fundamental problem in that the textile material that is laminated to the outside of the foam layer has a different elongation, or stretching properties, than the leather layer of the composite material. The textiles currently on the market that are used for the lamination do not have the elongation coefficients in the longitudinal and lateral direction required by currently used seat shapes and types of leather used for them. If the textile material layer in the composite material has a lower elongation than the leather, then the leather gathers when the leather-covered composite material is rolled toward the leather side or is even merely deformed. In an automobile seat, this gathering appears in the form of wrinkles in the leather surface. Because the textile cloth backing on the outside of the PUR soft foam layer was indispensable in order to produce the slipperiness required in order to be able to use the composite material, it has been necessary to accept the accompanying problems of wrinkle formation in the leather when it is stretched or deformed.

SUMMARY OF THE INVENTION

One object of the present invention is to remedy the above-mentioned shortcomings and to produce a leather or leather-like composite material that supports a soft foam layer laminated to its back side, the outside of which foam is treated so as to produce the slipperiness required for handling and for use, e.g. in upholstered furniture, while simultaneously remedying the problems of wrinkle formation in the leather when it is stretched or deformed.

This and other objects are attained in accordance with one aspect of the present invention directed to a composite material comprising a leather or leather-like material, a layer of soft foam laminated to a back side of said leather or leather-like material, and textile staple fibers secured to and covering an outer side of said foam layer, with the staple fibers being unconnected to one another.

In one embodiment, the outside of the soft foam is flocked with staple fibers. This is a well known term and refers to fibers of predetermined short length. Alternatively or in addition to this, the staple fibers would be applied in the form of a fleece (e.g. a non-woven or fibrous web material, with the fibers being only frictionally interconnected with one another, and all the fibers can be essentially oriented in a predetermined direction, or they can be in a random arrangement) that is attached to the soft foam layer in a locally delimited fashion.

Since the back side of the novel leather composite material thus produced is constituted by a textile material that has no lateral connections of the kind that exist in interwoven yarn systems (warp and weft) in a woven fabric and also in a knit fabric, the material that is laminated to the leather or leather-like material is distinguished by an extremely high elasticity that compensates for practically all of the different bending radii to which the leather is subjected, thus preventing the formation of wrinkles. The individual fibers of the textile staple fiber layer are advantageously attached to the soft foam layer at individual glue points that do in fact lie very close to one another, but are independent of one another so that the loose arrangement of the staple fibers that are not connected to one another does not in any way introduce rigidity into the overall composite of the system. At the same time, however, the textile staple fiber layer provides the back side of the novel leather composite material with an excellent degree of slipperiness in relation to all plastics, metals, lacquers, and upholstering materials.

The staple fibers can be synthetic or natural fibers as well as blends of them, at least part of which have a predetermined staple length and a predetermined fiber count. The staple length and fiber count are adapted to the requirements of the respective intended use of the composite material.

For the novel composite material, the preferred soft foam is polyurethane (PUR) soft foam, which can be open-pored and/or closed-pored on the outside of the layer. However, it is also conceivable to use other synthetic foams, for example polyester-based foams.

For the leather, essentially any sufficiently flexible and extensible leather quality can be used, independent of the tanning process used, with particular preference being given to those leather qualities suitable for use as upholstery covering material. Leather-like materials include materials that are distinguished by application properties and potential uses similar to those of genuine leather. They can, for example, be composed of leather remnants or scraps and/or can also come in the form of imitation leather.

The above-described novel leather or leather-like composite material that supports a soft foam layer laminated to its back side, the outside of which foam is covered by a layer of textile staple fibers that are not connected to one another, can be manufactured according to an aspect of the present invention with a method in which the back side of the leather or leather-like material is laminated to a layer comprised of a soft foam which, on its outside oriented away from the leather or leather-like material, supports a layer comprised of textile staple fibers that are not connected to one another, which have been attached to it in a preceding process step.

In one embodiment, the outside of the soft foam layer is flocked with textile staple fibers that are suitably glued to the soft foam at discrete glue points that are separate from one another. To that end, the surface of the soft foam that is to be provided with the staple fiber layer is sprayed with an adhesive and then flocked. After the flocking, the side of the soft foam layer oriented away from the flocking has an adhesive applied to it and it is then glued to the leather or leather-like material.

In another embodiment, the staple fibers can also be applied to the soft foam in the form of a fleece and glued to it at discrete spots that are separate from one another so as not to produce any detrimental impairments to the elongation of the material in the longitudinal and/or lateral direction.

The novel leather composite material described above can essentially be used in any field, but its particular properties make it especially suitable for use in the automotive field. It can be used to cover vehicle body parts or also as a covering material for automobile seats. These seats in particular are subjected to a particularly high degree of stress during use because the driver or passenger assumes a sitting position in which he is pressed snugly into such a seat, is laterally supported by the seat, and is simultaneously held in place by the safety belt.

BRIEF DESCRIPTION OF THE DRAWING

The sole FIGURE is a schematic cross-sectional depiction of a leather composite material according to the present invention.

DETAILED DESCRIPTION OF THE DRAWING

The schematic cross-sectional depiction of the novel leather composite material has a top layer or covering layer 1 comprised of leather or a leather-like material. Its inside or back side is covered with a layer 2 comprised of a soft foam, preferably a polyurethane (PUR) soft foam, with the interposition of a layer 3 of a thermoplastic adhesive. On its outside oriented away from the leather layer 1, the soft foam layer 2 is flocked (as described below) with textile staple fibers, which comprise a relatively thin layer that is labeled with the reference numeral 4 and completely covers the soft foam. The staple fibers of the staple fiber layer 4 are attached to the soft foam in regions of an adhesive layer 5 in such away that the staple fibers are not connected to one another.

When the leather composite material is deflected or stretched, the soft foam layer 2 can closely follow changes in shape, such as a stretching or deflection of the layer 1 of leather or leather-like material, without being hindered in any way by the flocking in the staple fiber layer attached to its outside. This prevents a deflection of the composite material from causing wrinkles to form on the front side of the leather or leather-like material of the layer 1. At the same time, the flocking provides a textile surface on the back side of the composite material that is distinguished by favorable sliding properties so that the material can be easily handled by sewing machines and when used as a covering material for upholstered furniture, in particular automobile seats, has the slipperiness that such an application requires.

As has been mentioned above, the soft foam of the layer 2 is preferably PUR soft foam, which is ether-based as well as ester-based. It is usually processed in the form of a continuously glued product that is split off a "long block." Depending on the intended use, the thickness can vary from approx. 1.5 mm to 100 mm or more. The minimum width dimension is unlimited (except by economic factors) and the maximum width is limited by the manufacturing width of the PUR soft foam material, which is currently a maximum of approx. 220 cm.

The staple fibers of the staple fiber layer 4 can be synthetic fibers, e.g. polyamide, polyester, copolyamide, copolyester, etc. However, natural fibers can also be used, e.g. wool fibers, viscose fibers, cellulose fibers, and the like. It is also conceivable to use blends of such fibers.

The fibers are cut to a definite staple length for the intended use and the fiber count is also defined as a function of the intended use. One example of staple fibers is made from the material Viscose with a length of 1.3 mm and a fineness of d-tex 0.9.

The composite material shown in the FIGURE can be manufactured in the following manner. In a first process step, an adhesive is sprayed to form individual glue points that are disposed very close to one another on one side of the soft foam that constitutes the layer 2. It is possible to use solvent-based adhesives such as those supplied in the form of water-soluble dispersions. The use of solvent-free adhesives has become more widespread in recent years due to their lower degree of toxicity to man and the environment. After being sprayed on, the adhesive requires a certain amount of time to set (sometimes called "open assembly time" or "wet edge time"). The staple fibers are applied to the adhesive before it sets so that the staple fibers can penetrate partway into the adhesive to form a secure chemical and/or mechanical bond. The fact that the adhesive is sprayed in this way onto the soft foam enables the staple fibers to be anchored to the soft foam at only the individual glue points that are independent of one another so that the loose arrangement of these fibers that are not connected to one another does not produce any rigidity in the overall composite material.

Alternatively, the adhesive can also be applied with another method appropriate to the intended use, for example by means of rollers or coating knives. It is only necessary to prevent the adhesive from forming a contiguous, more or less rigid or low-extensibility layer that would impair the deformability or extensibility of the composite material.

In a second process step, after the foam is sprayed with adhesive, an electrical charge is applied to the surface of the adhesive, which has a certain degree of conductivity. Then the fibers, which can take a certain electrostatic charge, are placed onto the soft foam in the electric field. In the electric field, they are accelerated so that they are driven a small distance into the adhesive, but the fibers are prevented from being glued to one another. Before they strike the adhesive, the fibers fly through an orienting screen so that they strike the electrically charged adhesive surface in a longitudinally oriented attitude perpendicular to the adhesive surface and become anchored at one end in the adhesive material. The process can also be carried out so that the fibers are aligned to strike the adhesive surface at a predetermined angle of less than 90° in relation to the surface of the foam.

When flocking a surface in an electrostatic field the fibers are oriented along the field lines. They will predominantly hit the substrate with their leading ends first. If the substrate is covered with an adhesive layer they will become anchored to the substrate by the adhesive in this way, thus producing a somewhat pelt-like arrangement. However, depending on the configuration of the electric field lines, the fibers may be more or less inclined with respect to the surface of the substrate, and some of them may even hit the adhesive layer at an intermediate point. There may even be some fibers which do not hit the adhesive layer surface but are just entangled in a random fashion among the fibers that are anchored at their ends. In spite of the adhesive being applied to the surface of the substrate in only a point wise or spot wise manner, in the course of the flocking process the whole surface of soft foam layer 3 will become covered with a flocked coating in which the individual fibers are not rigidly interconnected to one another. Because of the pelt-like structure of the coating the surface of soft foam layer 3 has a requisite slipperiness with respect to textile material of an upholstery with which it comes into contact or with respect to the stitch plate of a sewing machine.

Electrostatic flocking methods and systems are well known (e.g. see *Einführung in die Kunststoffverarbeitung* [Introduction to Plastics Processing] by Prof. Dr.-lng. Georg Menges, Karl Hanser Verlag, Munich/Vienna 1975), the relevant content of which is hereby incorporated by reference. They are used to visually enhance plastic surfaces (e.g. ball point pens in display packages), to visually enhance foam packaging (e.g. jewelry boxes), and for producing special, in particular inexpensive surface effects, to name only a few application areas. Consequently, details of the electrostatic flocking are not deemed necessary.

In another step of the process, the surface of the soft foam layer 3 oriented away from the flocking can have an adhesive applied to it, which is in particular comprised of a thermoplastic adhesive that can be scattered in the form of a powder and sintered in place or can be applied by means of methods using nozzles, rollers, or doctor blades. It is also possible to use adhesive sheets, adhesive webs, and many other known adhesive systems. In a final step, the leather or leather-like material 1 is laminated onto the adhesive arrangement on the surface of soft foam layer 3 opposite to the one which is flocked.

Alternatively to the flocking described above, staple fibers that are not connected to one another in the form of a fleece can also constitute the staple fiber layer 4. The fleece is attached to the soft foam at glue points that are spatially separate from one another so that it does not impair the longitudinal and lateral extensibility of the composite material.

We claim:

1. A method for manufacturing a composite material, comprising the steps of:
    providing a sheet of leather or leather-like material with an outer side and a back side;
    providing a layer comprised of a soft foam;
    flocking one side of the layer with textile staple fibers, wherein the fibers are glued to the one side of the layer at discrete glue points which are separate from each other so that the fibers are not connected to one another and do not introduce rigidity into the composite material; and
    laminating the flocked layer to said back side of said sheet of leather or leather-like material so that the one side of the layer carrying the fibers faces away from the sheet of leather or the leather-like material.

2. The method of claim 1, wherein the one side of the layer to be provided with the fibers is sprayed with an adhesive before the flocking.

3. The method of claim 2, further comprising the step of applying an adhesive to the other side of the layer between the flocking and laminating.

4. The method of claim 1, wherein the fibers are applied to the one side of the layer in the form of a fleece.

5. A method for covering upholstered furniture with a covering material including a leather or leather-like material, comprising the steps of:
    providing a sheet of leather or leather-like material with an outer side and a back side;
    providing a layer comprised of a soft foam;
    flocking one side of the layer with textile staple fibers, wherein the fibers are glued to the one side of the layer at discrete glue points which are separate from each other so that the fibers are not connected to one another and do not introduce rigidity into the covering material;
    forming the covering material by laminating the flocked layer to said back side of said sheet of leather or leather-like material so that the one side of the layer carrying the fibers faces away from the sheet of leather or leather-like material; and
    covering the furniture with the covering material.

6. The method of claim 5, wherein the furniture is an automobile seat.

\* \* \* \* \*